United States Patent [19]

Mahr

[11] Patent Number: 5,034,829
[45] Date of Patent: Jul. 23, 1991

[54] TRACK POSITIONING ARRANGEMENT IN A HEAD WHEEL FOR A RECORDER

[75] Inventor: Peter Mahr, Königsfeld-Weiler, Fed. Rep. of Germany

[73] Assignee: Deutsche Thomson-Brandt GmbH, Villingen-Schwenningen, Fed. Rep. of Germany

[21] Appl. No.: 502,961

[22] Filed: Apr. 2, 1990

[30] Foreign Application Priority Data

Aug. 12, 1987 [DE] Fed. Rep. of Germany ....... 3726767

[51] Int. Cl.$^5$ .......................... G11B 5/588; G11B 5/53
[52] U.S. Cl. .................................. 360/77.130; 360/75; 360/84; 360/107
[58] Field of Search .................... 360/75, 84, 107, 109, 360/77.12, 77.13, 77.16, 78.02, 70, 69, 85, 130.24, 137

[56] References Cited

U.S. PATENT DOCUMENTS 4,774,606 9/1988 Uhde .................................... 360/75

FOREIGN PATENT DOCUMENTS 0197333 10/1986 European Pat. Off. .
3307324 9/1984 Fed. Rep. of Germany .
3517317 11/1986 Fed. Rep. of Germany .
3608379 9/1987 Fed. Rep. of Germany .
3629509 3/1988 Fed. Rep. of Germany ... 360/77.12
55-73925 6/1980 Japan .
1476819 6/1977 United Kingdom .

OTHER PUBLICATIONS

IBM Technical Disclosure Bulletin, vol. 23, No. 1, dated Jun. 1980, entitled Rotary Head Tape Device, in the names of C. C. Roshon and L. D. Stevens.

Primary Examiner—Aristotelis M. Psitos
Assistant Examiner—Steven R. Garland
Attorney, Agent, or Firm—Joseph S. Tripoli; Joseph J. Laks; Sammy S. Henig

[57] ABSTRACT

A rotating head wheel for a recorder wherein the head wheel is additionally displaceable in the direction of its axis of rotation. The displacement is produced by mounting the head wheel on a threaded spindle which rotates in the same direction as the head wheel and whose rate of rotation is variable. A first sensor generates a pulse each revolution of the head wheel. A second sensor generates a pulse each revolution of the threaded spindle. The pulses of the first and second sensors and a pulse produced by a position sensor are used for controlling the magnitude of the displacement.

16 Claims, 2 Drawing Sheets

TRACK POSITIONING ARRANGEMENT IN A HEAD WHEEL FOR A RECORDER

This application is a continuation of an international application, filed Aug. 6, 1988, Ser. No. PCT/EP 88/00707, designating the United States and claiming priority from a German Patent Application filed Aug. 12, 1987, Ser. No. P 37 26 767.1.

The invention relates to a head wheel arrangement of a recorder.

A recording head wheel arrangement with a periodic stroke or lifting movement of the head wheel may be necessary for a so-called matrix-type recording. In the matrix-type recording, successive blocks are recorded with recording tracks running approximately parallel to the edge of the tape, as disclosed in a German Offenlegungsschrift (laid open patent application) DE-3509584. The lifting motion can also serve for shifting the head wheel to another area of the magnetic tape. This is practical when, according to German Patent document No. DE-OS 33 07 324, two or more track lines are recorded on the magnetic tape with different signals. A lifting motion is also required in a recorder with angular track recording in which the head wheel is shifted in the direction of its axis for keeping track of extra runs.

Such head wheel arrangement is described in U.S. Pat. No. 4,774,606 in the name of Uhde, entitled "HEAD WHEEL ARRANGEMENT FOR A RECORDER WITH THREADED SPINDLE FOR ADJUSTABILITY" (The Uhde Patent). In the Uhde Patent arrangement, a rotating head wheel rotated by a first motor is mounted, by way of an engaging nut, on a threaded spindle rotating in the same direction by a second motor. The rotation speed of the spindle varies in accordance with a control voltage of at least one of the motors so as to perform the stroke movement. When the rotational speeds of the rotating head wheel and of the motor that causes the rotation of the spindle are exactly equal, no lifting effect is caused by the spindle. During the lifting process, that is used in either signal recording or reproduction, a precise track-keeping is possible, for example, by means of a phase-lock-loop (PLL) control responsive to tachometer signals.

It has been suggested in a German Patent Application No. P 36 08 379 to use position sensors for the positioning of the head wheel, for example, for recording of a first magnetic track in a block of tracks lying side by side, nearly in parallel to the edge of the tape. By using the position sensors, the side edges of the magnetic tape are recognized and the location of a first magnetic track is determined. Such a way of positioning is complicated due to tolerances in the physical locations of the sensors that are inevitable in mass production.

It may be desirable to identify within a lifting area, the location of a predetermined magnetic track within a magnetic tape width such that tolerances are compensated for.

To that end, the rotating head wheel and the threaded spindle are rotated at corresponding speeds that are constant but that are slightly different from each other. The head wheel and the spindle cooperate with non-adjusted, first and second sensors, respectively, embodying an aspect of the invention. Each of the first and second sensors generates an impulse in every corresponding revolution. These impulses are coupled to counting circuits.

In a measuring process, a time difference between the impulses of the two sensors that is determined by the mechanical location and affected by tolerances can be measured. This value is stored and used as a corrective factor for further measurements.

The actual measuring process for the determination of the exact location of a point of the rotor in relation to a fixed point, for example, the position of a magnetic head of the rotating head drum in relation to edges of a magnetic tape surrounding the head drum, is performed during a lifting movement by slowly "running-through" a lifting process or a lifting area.

For this it may be necessary to establish the lifting area which is to be used as a basis for the measurement. The starting point of the lifting area can be determined, for example, by a third sensor utilizing a photoelectric barrier located in the path of the lifting movement. Using this sensor output, the absolute position is approximately determined. The tolerance deviation of the localization of the head wheel with respect to the fixed point should not exceed the value of the pitch of the thread of the spindle. Thus, for example, in a spindle having a pitch of 0.5 mm per revolution, the value determined preferably should be less than 0.5 mm.

The end point for the measuring process in the example of the head drum can be determined by scanning a reference magnetic tape. Using such reference magnetic tape, an optimum end position in a lifting direction is predetermined by a prerecorded reference magnetic track. The recorded magnetic track runs in parallel with the edge of the tape. Thus, the end point is determined when the information recorded on the reference magnetic track is identified.

The measuring process may be performed in a predetermined lifting direction only once after the apparatus has been assembled. During the measuring process, a time difference, $\Delta t$, between corresponding impulses produced by the first and second sensors, respectively, are measured. The value, $\Delta t$, obtained when the reference magnetic track is reached, is stored in a permanent memory.

The stored value of time difference $\Delta t$ can be used to position the head drum at its exact end position for further starting processes with, for example, a tape on which no reference magnetic track is recorded. Starting from this point of reference any other desired lifting height can be determined and the respective position can be achieved.

For a desired track with a lifting height $H_1$, the following relation results:

$$H_1 = \frac{s \cdot \Delta t}{T} + s \cdot (n2 - n1)$$

T represents the period duration of the impulses which are produced by the sensor that is indicative of the speed of the first motor that rotates the head wheel, "s" represents the pitch of the threaded spindle, $n2-n1$ represents a difference between the number of revolutions, n2, of the second motor and the number of revolutions, n1, of the first motor for obtaining the measuring distance $H_1$.

BRIEF DESCRIPTION OF THE DRAWINGS

In FIG. 1, a shaft 4 supporting a threaded spindle 6 is mounted by means of bearings 2 and 3 to be rotatable but not axially displaceable. The lower end of shaft 4 is connected with a rotor 5 of a motor M2 whose stator 7 is fixed to frame 1. A head wheel 8 including a head disc 12, heads K1, K2 and drum 14 is rotatably mounted on the shaft 4 by way of slide bearings 9 and 10. Threaded spindle 6 engages into a nut 11 fixed on drum 14. A magnetic tape 15 is guided around head wheel 8, for example over an angle of 180°. Heads K1 and K2 feed signals to recording or playback amplifiers via rotating transducers 22. A motor M1 has a rotor 16 which is additionally fastened to drum 14. A stator 19 of motor M1 includes a stator winding 20 and is mounted on drum 14 by way of bearings 28 and 29 so as to be rotatable relative to drum 14. Stator 19 is connected with frame 1 by way of a guide 13 and a bearing axle 17 in such a way that stator 19 is slidable in the axial direction A—A but rotation of stator 19 is prevented.

Parts 9, 10, 11, 12, K1, K2 and 14 form that part of the head wheel arrangement which rotates about axis A—A. Parts 19, 20 and 13 constitute that part of the head wheel arrangement which is unable to rotate but is displaceable in the direction of axis A—A.

Figure 2:
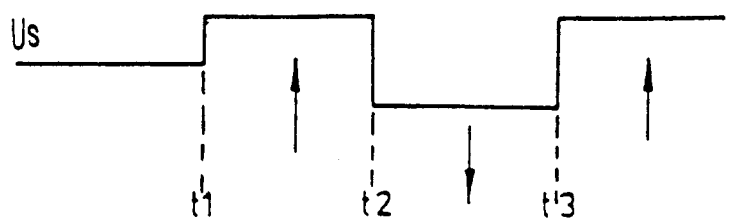
FIG. 2 shows a diagram for controlling the lifting arrangement of FIG. 1.

The arrangement operates as follows: motor M1 is driven at a constant speed of approximately 6000 rpm so that head wheel 8 rotates at that speed around axis A—A. Shaft 4 and threaded spindle 6 are driven by motor M2 in the same direction as head wheel 8 and at the same rpm. Due to the identical rpm's, there is no relative movement between threaded spindle 6 and nut 11 so that head wheel 8 rotates but is not moved in the direction of axis A—A. This state is indicated in FIG. 2 before time t1. At time t1, a control voltage Us, applied via terminals 18 to coil 27 of motor M2, is increased so that motor M2 runs faster, e.g. at 6010 rpm. This causes threaded spindle 6 to slowly screw itself into nut 11 so that head wheel 8 undergoes a downward movement in the direction indicated by arrow 34a in the desired manner. At time t2, control voltage Us, and thus the rpm of threaded spindle 6, are reduced correspondingly so that now threaded spindle 6 screws itself out of nut 11 and head wheel 8 is moved upwardly in a direction indicated by arrow 34b. The amplitude of voltage Us assumed at times t1, t2 and t3 determines the speed of the axial displacement and the time elapsed from t1 to t2 or from t2 to t3 determines the magnitude of such axial displacement, as explained in the Uhde Patent that is incorporated by reference herein.

When the maximum permissible axial displacement is reached, guide 13 acts on contacts 25 or 26 which switch off the drive from motors M1 and M2. This prevents nut 11 from being moved beyond the ends of the threaded spindle 6.

An iron-free, electronically commutated, air coil motor is employed for motor M1 and an electronically commutated flat rotor for motor M2. However, mechanically commutated motors, armature motors and the like can also be employed.

The electronic control system for the two motors M1 and M2 is configured so that the two motors start up and run down uniformly and in synchronism. This is important to prevent an undue deviation in the rpm's of the two motors M1 and M2 from creating an unduly large axial displacement.

The cooperation between nut 11 and threaded spindle 6 can also be realized by a circulating ball drive. In such a drive, balls are arranged in part of a threaded passage and, after passing, for example, through one turn, drop back into a chamber or a cavity in the nut to then be re-introduced into a turn of the thread. Such circulating ball drives are commerically available and permit particularly smooth and clean transfer of motion without play or friction.

Figure 1:
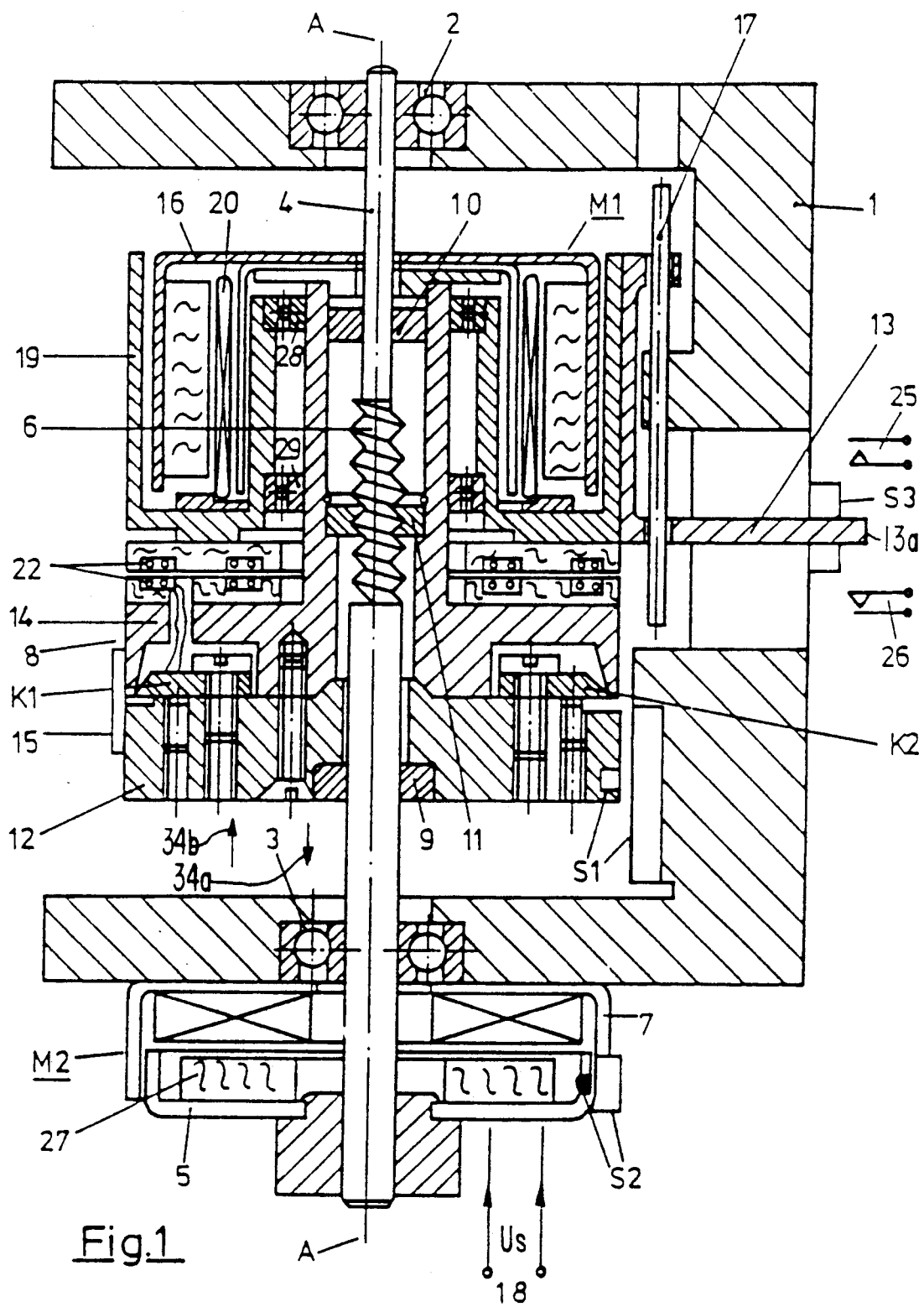
FIG. 1 shows a lifting arrangement for a head drum of a video recorder with a rotating threaded spindle.
Figure 3:
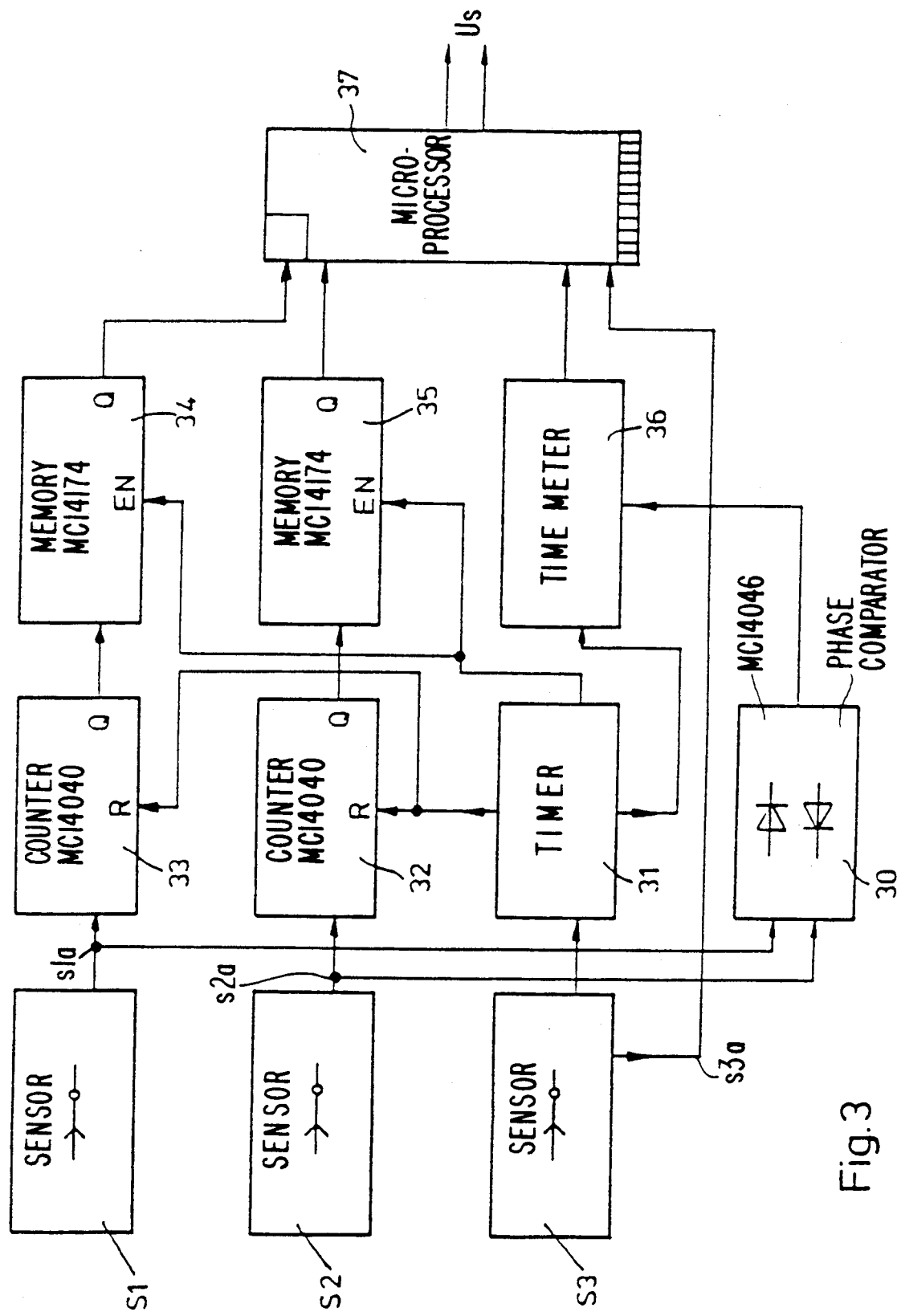
FIG. 3 shows an arrangement by which the location of a magnetic track, i.e. the relative height of the magnetic heads with respect to the magnetic tape, is adjusted.

FIG. 3 illustrates a control circuit, embodying an aspect of the invention, for producing control voltage Us of FIG. 2 that controls the rpm of motor M2 of FIG. 1 and the interval in which the rpm's of motors M1 and M2 are different that produces the axial displacement movement. By varying the axial displacement, the location of a given magnetic track of magnetic tape 15 is established. The location of the magnetic track is determined by the height of magnetic heads K1 and K2 relative to top or bottom edges of magnetic tape 15. Similar symbols and numerals in FIGS. 1-3 indicate similar items or functions. Control input information required for the operation of the circuit of FIG. 3 is supplied by sensors S1, S2 and S3 of FIG. 1.

During the axial upward movement, an extension arm 13a of guide 13 of FIG. 1 slides along position sensor S3 affixed to frame 1 for generating a pulse s3a. Pulse s3a provides a beginning reference position of heads K1 and K2 within a lifting area in relation to frame 1. Sensor S3 can be designed, for example, as an optocoupler or as a proximity switch.

Sensor S1 that is associated with head wheel 8 produces a pulse s1a of FIG. 3 in each revolution independent of the respective lifting position or displacement. Similarly, motor M2 of FIG. 1 is also provided with sensor S2 that generates a pulse s2 of FIG. 3 in each revolution of shaft 4 of FIG. 1. Pulses s1a and s2a, generated by sensors S1 and S2 of FIG. 3, are coupled to inputs of counting circuits 33 and 32, respectively. The outputs of counting circuits 33 and 32 are coupled via intermediate memories 34 and 35, respectively, to a microprocessor 37. On "running through" one lifting process, sensor S3 produces position pulse s3a which triggers a timer circuit 31. Timer circuit 31 generates clock pulses for controlling a measuring process in circuit elements 32 through 37.

A service or calibration measuring process may be performed, for example, only once after the apparatus has been assembled or manufactured. The number of difference revolutions, n2−n1, between the total number of pulses s2a and s1a produced by sensors S1 and S2 are measured for a predetermined measuring distance H within one lifting run by counting circuits 32 and 33. Also, a time difference Δt is measured between a pair of pulses s1a and s2a. Time difference Δt is measured by a phase comparator 30 in cooperation with a time meter 36. The values n2−n1 and Δt are stored in permanent memory.

The beginning of the measuring distance H in the measuring process is recognized by the occurrence of pulse s3a of sensor S3 which provides a time reference triggering operation for the measuring process. The end of the measuring distance H, during the service measuring process, is recognized when information prerecorded in a reference magnetic tape is detected. The information in the referenced magnetic tape is prerecorded in a reference magnetic track having an optimum distance in relation to an edge of the magnetic tape. Upon detection of the information in this reference magnetic track by one of magnetic heads K1 and K2, during the "running through" of such lifting run, the measuring process is terminated. The value, Δt, between the last pair of pulses s1a and s2a and the value, n2−n1, that occur when the distance H of the reference magnetic track is reached, are stored in a permanent memory coupled to microprocessor 37.

The stored value, Δt, can be used each time such displacement of distance H is desired. When the operation of the apparatus is restarted with a different magnetic tape on which no reference magnetic track is recorded, displacement motion is terminated at the distance H when the measured value, Δt, is equal to the corresponding stored value previously obtained. In this way, the exact end position of head wheel 8 is adjusted to the height H which is the same as the height of the optimum magnetic track prerecorded on the reference magnetic tape. It is assumed that the rotational rate of motor M1 is constant.

The tolerance of the location of head wheel 8 that causes sensor S3 to generate pulse s3a should, preferably, not exceed the pitch of the spindle in relation to the reference magnetic track. For example, in a spindle having a pitch of 0.5 mm per revolution, the tolerance preferably should not exceed 0.5 mm.

Microprocessor 37 adjusts the head wheel position by controlling voltage Us between terminals 18 that controls motor M2. Starting from this point of reference, every other desired lifting height $H_1$ can be determined and realized by microprocessor 37 using the following formula.

$$H_1 = \frac{s \cdot \Delta t}{T} + s \cdot (n2 - n1)$$

In this formula, T represents the period between immediately occurring, consecutive pulses s1a of sensor S1, "s" represents the pitch of the thread of nut 11, and (n2−n1) represents the difference between the number of pulses s2a and s1a that occur for such lifting height $H_1$.

By means of the described circuit, an exact adjustment of magnetic tracks with an accuracy that is within a range of a micrometer is possible. Differences in track positions of recorders of the same manufacture are thereby avoided. In a circuit built according to FIG. 3 commercially available integrated circuits were used whereby the functions of such circuits can be incorporated in a microprocessor arrangement in total or in part.

What is claimed is:

1. Head wheel arrangement for a magnetic recorder, comprising:
   a head wheel about which a magnetic tape is guided having a magnetic head, said head wheel being rotatably driven by a first motor, and having an axis about which said head wheel is rotatable;
   a threaded spindle rotatably driven by a second motor about said axis such that said head wheel is threadably mounted on said threaded spindle for displacement relative to said threaded spindle in a direction of said axis when said head wheel and said threaded spindle are rotated with different rates of rotation;
   a first sensor for generating a first pulse each time a first predetermined number of revolutions of said head wheel occurs;
   a second sensor for generating a second pulse each time a second predetermined number of revolutions of said spindle occurs;
   means responsive to said first and second pulses for generating a signal that is indicative of a time difference between a pair of said pulses of said first and second sensors, respectively; and
   means responsive to said time difference indicative signal for generating a control signal that is coupled to one of said motors to control said motor rotation rate and said displacement.

2. An arrangement according to claim 1 further comprising, counting means for counting said pulses of said first and second sensors to produce a count difference of said pulses that are generated by said first and second sensors wherein said displacement is controlled in accordance with said count difference.

3. An arrangement according to claim 1 further comprising, a position sensor wherein said displacement is controlled in accordance with an output signal of said position sensor.

4. An arrangement according to claim 1 further comprising a position sensor for generating a signal when said displacement is at a first predetermined distance and means responsive to an output of said magnetic head for generating a signal that is indicative when a displacement that corresponds with a reference magnetic track is reached.

5. An arrangement according to claim 1 further comprising, means for calculating a displacement that corresponds with a first magnetic track using the following formula:

$$\frac{s \cdot \Delta t}{T} + s \cdot (n2 - n1),$$

wherein "s" represents a pitch of said threaded spindle, Δt represents said time difference, T represents the period between pulses generated by said first sensor, n1 represents a number of revolutions of said first motor and n2 represents a number of revolutions of said second motor.

6. An arrangement according to claim 1, wherein during a calibration process, a reference magnetic tape having a predetermined prerecorded magnetic track is scanned and a value representative of said time difference, that occurs when information recorded in said prerecorded magnetic track is detected, is stored in a memory and wherein said control signal generating means is responsive to an output signal of said memory to control, in accordance with said memory output signal, a magnitude of said displacement.

7. An arrangement according to claim 6 wherein, during said calibration process, a value representative of a difference between a first count of said pulses that are generated by said first sensor and a second count of said pulses that are generated by said second sensor is stored in said memory and wherein said control signal generating means is responsive to said output signal of said memory to control said magnitude of said displacement in accordance with said count difference.

8. An arrangement according to claim 1 wherein said control signal generating means comprises a microprocessor.

9. Head wheel arrangement for a magnetic recorder, comprising:
- a head wheel about which a magnetic tape is guided having a magnetic head, said head wheel being rotatably driven by a first motor, and having an axis about which said head wheel is rotatable;
- a threaded spindle rotatably driven by a second motor about said axis such that said head wheel is threadably mounted on said threaded spindle for displacement relative to said threaded spindle in a direction of said axis when said head wheel and said threaded spindle are rotated with different rates of rotation;
- a first sensor for generating a first pulse each time a first predetermined number of revolutions of said head wheel occurs;
- a second sensor for generating a second pulse each time a second predetermined number of revolutions of said spindle occurs;
- means for generating a control signal that is coupled to one of said motors to control said one motor rotation rate;
- means responsive to said first and second pulses for generating a signal that is indicative of a time difference between a pair of said pulses of said first and second sensors, respectively; and
- means responsive to said time difference indicative signal for measuring, in accordance therewith, said displacement.

10. An arrangement according to claim 9 further comprising, counting means for counting said pulses of said first and second sensors to produce a count difference of said pulses that are generated by said first and second sensors wherein said displacement is measured in accordance with said count difference.

11. An arrangement according to claim 9 further comprising, a position sensor wherein said displacement is measured in accordance with an output signal of said position sensor.

12. An arrangement according to claim 9 further comprising a position sensor for generating a signal when said displacement is at a first predetermined distance and means responsive to an output of said magnetic head for generating a signal that is indicative when a displacement that corresponds with a reference magnetic track is reached.

13. An arrangement according to claim 9 further comprising, means for calculating a displacement that corresponds with a first magnetic track using the following formula:

$$\frac{s \cdot \Delta t}{T} + s \cdot (n2 - n1),$$

wherein "s" represents a pitch of said threaded spindle, $\Delta t$ represents said time difference, T represents the period between pulses generated by said first sensor, n1 represents a number of revolutions of said first motor and n2 represents a number of revolutions of said second motor.

14. An arrangement according to claim 9, wherein during a calibration process, a reference magnetic tape having a predetermined prerecorded magnetic track is scanned and a value representative of said time difference, that occurs when information recorded in said prerecorded magnetic track is detected, is stored in a memory and wherein said control signal generating means is responsive to an output signal of said memory to control a magnitude of said displacement.

15. An arrangement according to claim 14 wherein, during said calibration process, a value representative of a difference between a first count of said pulses that are generated by said first sensor and a second count of said pulses that are generated by said second sensor is stored in said memory and wherein said control signal generating means is responsive to an output signal of said memory to control said magnitude of said displacement in accordance with said count difference.

16. An arrangement according to claim 9 wherein said control signal generating means comprises a microprocessor.

* * * * *